United States Patent [19]

Laudemann et al.

[11] 4,103,831
[45] Aug. 1, 1978

[54] BALE HANDLING DEVICE

[76] Inventors: Ronald L. Laudemann, Rte. 1 - Box 39; Gary L. Kasten, Rte. 1 - Box 98, both of White City, Kans. 66872

[21] Appl. No.: 792,650

[22] Filed: May 2, 1977

[51] Int. Cl.² ................................................ B60P 1/04
[52] U.S. Cl. ........................... 214/1 HA; 214/147 G; 214/DIG. 4; 242/86.5 R
[58] Field of Search ............ 214/1 HH, 1 HA, 130 C, 214/147 R, 147 G, 390, 350, 351, 353, DIG. 1, DIG. 4; 242/86.5 R

[56] References Cited

U.S. PATENT DOCUMENTS

| | | | |
|---|---|---|---|
| 3,677,428 | 7/1972 | Mallett | 214/147 G |
| 3,877,595 | 4/1975 | Edelman | 214/147 G X |
| 3,908,846 | 9/1975 | Brummitt | 214/653X |
| 3,946,887 | 3/1976 | Parker | 214/653 |
| 4,049,140 | 9/1977 | Roose | 214/147 G |

*Primary Examiner*—L. J. Paperner
*Attorney, Agent, or Firm*—John A. Hamilton

[57] ABSTRACT

A bale handling device consisting of a wheeled cart adapted to be hitched to a towing vehicle and including a pair of laterally spaced apart arms pivotal on upright vertical axes to bring their free ends opposite the ends of a cylindrical bale resting on the ground, each arm carrying a spindle insertable axially into the bale by movement of the arms toward each other, the arms being pivotal about a transverse horizontal axis to elevate the bale above the ground for transport, or to rest the bale on the ground to be unrolled on the ground by movement of the cart, for the purpose of feeding livestock.

4 Claims, 9 Drawing Figures

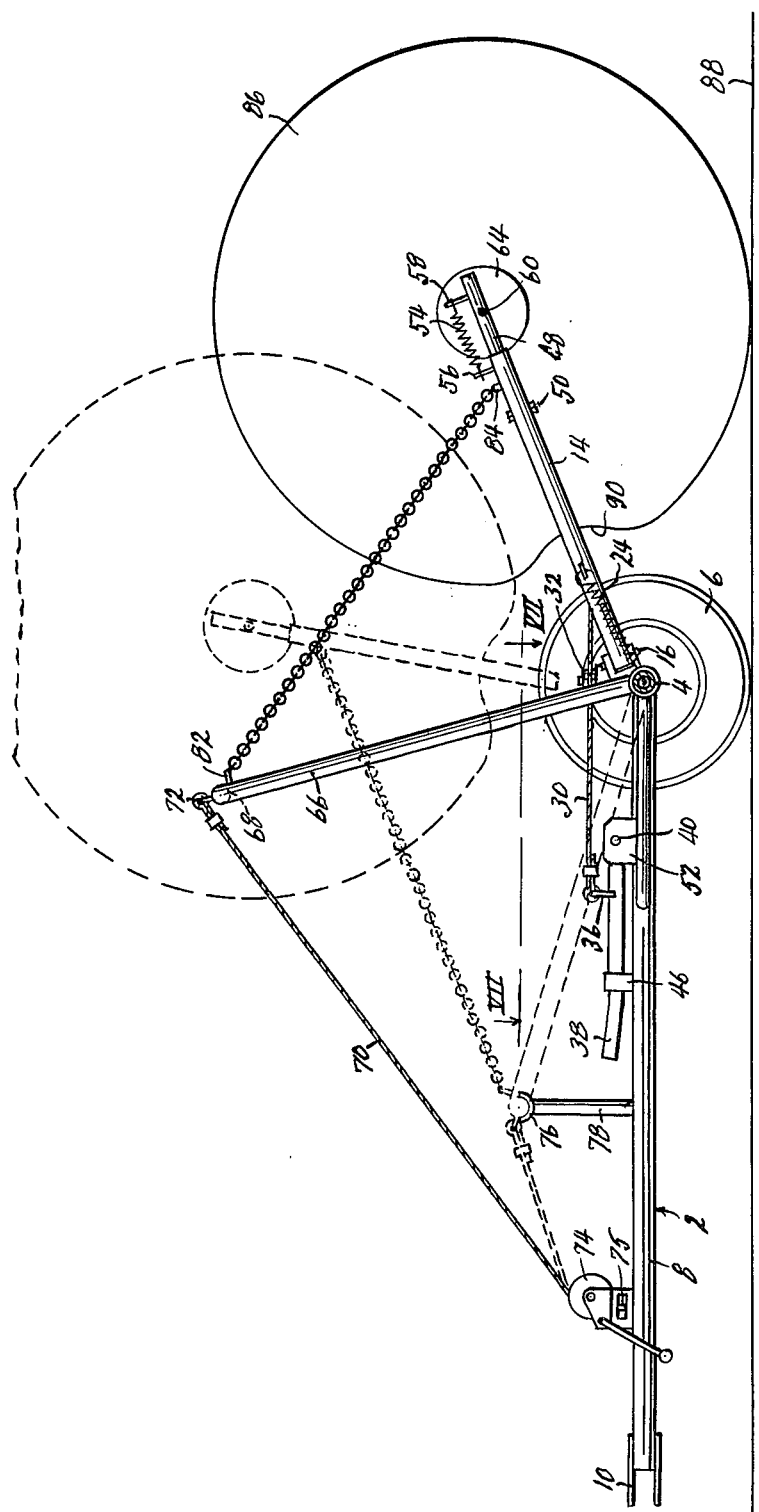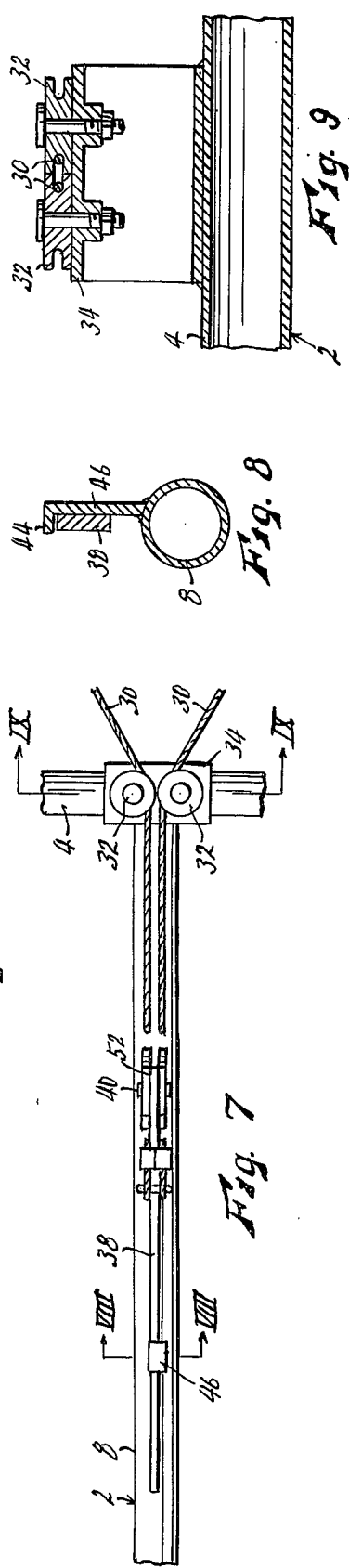

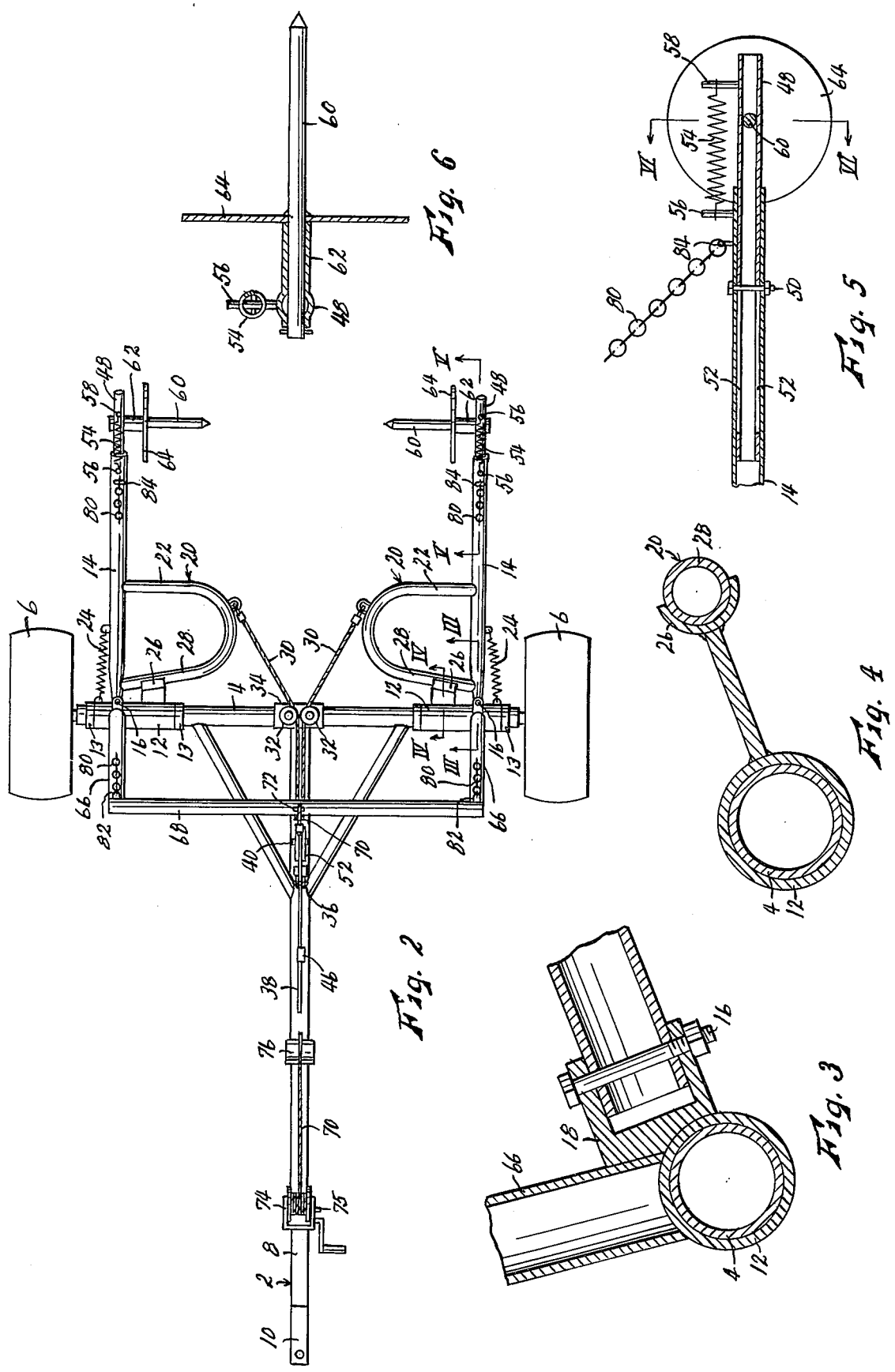

BALE HANDLING DEVICE

This invention relates to new and useful improvements in devices for handling and transporting bales of hay or the like, and has particular reference to such a device for use in connection with large cylindrical bales, a popular size of which is about 6 feet in diameter and about 5½ feet in axial length, and may weigh from 1500 to 2000 pounds.

For various reasons, such large cylindrical bales have come into extremely wide and popular usage in recent years for the keeping and storage of hay and the like, but so far as is within our knowledge, there remains the problem of providing a simple, economical, efficient and dependable means for picking up and transporting such bales, due to their large, cumbersome size and heavy weight. The provision of a device for accomplishing these functions is the overall object of the present invention. Generally, this object is accomplished by the provision of a wheeled cart adapted to be hitched to a towing vehicle and having a pair of laterally spaced arms projecting rearwardly therefrom. Said arms are pivotal on generally vertical axes at their forward ends, so that they may be spread apart to encompass the ends of a bale resting on the ground, then moved together to grip the bale, each having a spindle which then enters the bale substantially axially thereof. The arms are also pivotal relative to the cart on a horizontal transverse axis, whereby when the arms are raised, the spindles elevate the bale above the ground for transport.

Another object is the provision of a bale handling device of the character described which is capable of unrolling the bale on the ground for feeding it to livestock. Such bales are originally formed by rolling a flat layer or "batt" of hay tightly about an axis and securing it by twine tied about its cylincrical surface, but due to their size and density are not well adapted for allowing livestock to feed directly therefrom.

A further object is the provision of a bale handling device of the character described having an auxiliary bale support for assisting the spindles in supporting the bale, in order that said bale will not tear loose from the spindles when being jostled and bounced as they are transported over rough terrain. The auxiliary supports also assist automatically to insert the spindles into the bale, and are automatically separated from the bale whenever it may be desired to unroll the bale, so as not to interfere with the rotation of the bale on the spindle.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a bale handling device embodying the present invention, operatively engaged with a bale, the near-side cart wheel being omitted, showing the bale resting on the ground in solid lines, and elevated to a transport position in dotted lines, FIG. 2 is a top plan view of the device as shown in FIG. 1, with parts broken away and with the bale omitted, FIG. 3 is an enlarged, fragmentary sectional view taken on line III—III of FIG. 2, FIG. 4 is an enlarged sectional view taken on line IV—IV of FIG. 2.

FIG. 5 is an enlarged, fragmentary sectional view taken on line V—V of FIG. 2,

FIG. 6 is an enlarged sectional view taken on line VI—VI of FIG. 5,

FIG. 7 is an enlarged, fragmentary view taken on line VII—VII of FIG. 1,

FIG. 8 is an enlarged sectional view taken on line VIII—VIII of FIG. 7, and

FIG. 9 is an enlarged, fragmentary sectional view taken on line IX—IX of FIG. 7.

Like reference numerals apply to similar parts throughout the several views, and the numeral 2 applies generally to the cart portion of the present device. Said cart includes a horizontal, transversely extending axle bar 4 having a ground-engaging wheel 6 rotatably mounted at each end thereof, and a tongue bar 8 fixed at right angles to the midpoint of said axle bar and extending forwardly therefrom. Tongue bar 8 is provided at its forward end with a hitch 10 for connecting the cart to a tractor, truck or other towing vehicle.

Mounted coaxially for rotation on axle bar 4, respectively adjacent each end thereof, are a pair of cylindrical sleeves 12. Said sleeves are prevented from sliding axially along the axle bar by collars 13 welded to the axle bar at the ends of the sleeves. Extending generally rearwardly from each of said sleeves is an arm 14. Each arm is pivoted at its forward end, as by a bolt 16, to a bracket 18 (see FIG. 3) welded to the sleeve, the axis of said bolt being transverse to the arm and lying in a vertical plane. Thus the arms 14 may pivot in generally horizontal planes, toward and from each other. Each arm has affixed thereto, adjacent its forward pivoted end, a bale support member 20, best shown in FIG. 2. Said bale support lies in the plane of arms 14, and each is of generally U-form, with its ends affixed to its associated arm, so as to extend toward the other arm. The rearward leg 22 of each support is disposed at right angles to the associated arm. Each arm is resiliently biased away from the other arm by a spring 24 connected at its rearward end to the outer side of the arm, and at its forward end to the associated sleeve 12. Thus they may swing relatively farther away from each other than shown in FIG. 2, so as to be rearwardly divergent. However, their relative inward movement is limited to that shown in FIG. 2, wherein they are parallel, by a stop 26 welded to each sleeve 12 and adapted to engage the forward leg 28 of the associated support member 20 (see FIGS. 2 and 4). The arms may be forcibly drawn closer together by a pair of cables 30, each connected at its rearward end to one of supports 20 adjacent the inner end of the latter. Said cables converge forwardly, and are trained respectively about a pair of pulleys 32 rotatably mounted in side-by-side relation on a bracket 34 mounted on axle bar 4 at its midpoint. Said cables extend forwardly from the pulleys, and are connected at their forward ends, as at 36, to an intermediate point of an elongated lever 38 normally extending parallel to tongue bar 8 thereabove. The rearward end of said lever is pivoted, as at 40, to a bracket 42 welded to the top surface of the tongue. When the lever is pivoted upwardly and rearwardly, cables 30 are loosened and arms 14 are swung apart by springs 24. When it is pivoted forwardly and downwardly to the position shown, cables 30 are tightened and draw arms 14 firmly against stops 26. In this position, it may be deflected laterally and snapped beneath the toe 44 of a keeper 46 (see FIG. 8) welded to the tongue, whereby it is releasably secured in this position.

At the rearward end of each arm 14, an arm extension 48 is slidably telescoped therein and extends rearwardly therefrom. Its sliding movement is limited by a bolt 50 (see FIG. 5) fixed transversely in arm 14 and engaged in a longitudinal slot 52 formed in the arm extension 48. It is biased to its forwardmost position, as shown, by a tension spring 54 extending between and connected to a pin 56 fixed on arm 14, and a pin 58 fixed on extension 48. A spindle 60 is carried rotatably in a bearing tube 62 fixed to the extended portion of each arm extension 48. Said spindles are coaxial when arms 14 are parallel as in FIG. 2, and extend horizontally inwardly, being pointed at their inner ends. A circular pressure plate 64 is affixed concentrically to each spindle in spaced relation from the point thereof.

An upright beam 66 is affixed to each of sleeves 12, projecting upwardly therefrom at approximately right angles to the associated arm 14. Said beams are parallel, and are rigidly connected together at their upper ends by a cross bar 68 which is parallel to axle bar 4. A cable 70 is connected to the midpoint of the cross bar at 72, and extends downwardly and forwardly therefrom, being wound on a crank-operated winch 74 mounted on tongue 8 adjacent its forward end. An electric winch could also be used if desired. Said winch is provided with a manually movable control 75, by means of which it may be selectively set to reel cable 70 in, or pay said cable out, on turning of the crank, or to disengage the winch drum from the crank to permit free wheeling thereof. Such winches are common and well known. An upwardly opening cradle 76 is mounted on a post 78 affixed to tongue 8 in a position to receive cross bar 68 when beams 66 are tilted forwardly by reeling cable 70 onto winch 74. A chain 80, operable to assist arms 14 in supporting the weight of a bale, is connected to each beam 66 at its upper end, as at 82, then extends downwardly and rearwardly, being connected at its lower end, as at 84, to the associated arm 14 adjacent its rearward end.

In operation, lever 38 is first pivoted upwardly and rearwardly to allow arms 14 to be swung apart by springs 24. The pointed ends of spindles 60 will then be spaced apart by a distance greater than the axial length of a cylindrical bale 86 of hay or the like resting on the ground surface 88. Then arms 14 are pivotally raised or lowered by operation of winch 74 until spindles 60 are disposed at the vertical elevation of the axis of the bale. This elevation may vary considerably due to variations in bale diameter, and to the fact that the bale may be somewhat flattened to oval form by its own weight if it has been left in the field for considerable periods of time. In this connection, it should be noted that spindles 60 may be lowered substantially to ground level if necessary. Then, by maneuvering the towing vehicle to which hitch 10 is connected, cart 2 is backed into position with arms 14 bridging the ends of the bale. During this movement, rearward legs 22 of support members 20 of the arms engage and may considerably indent the cylindrical surface of the bale, as indicated at 90. The resulting forward pressure on support members 20 tends to swing arms 14 inwardly toward each other, so that the pointed ends of spindles 60 enter axially into the bale. This insertion of the spindles may be completed, so that said spindles are brought into coaxial relation and forward support legs 28 are brought into firm engagement with stops 26, by pivoting lever 38 forwardly and downwardly to the position shown, and securing it in this position by engaging it beneath keeper 46.

Winch 74 may then be operated to reel in cable 70, thereby pivoting arms 14 upwardly and forwardly, and beams 66 forwardly and downwardly, until cross bar 68 of said beams rests in cradle 76. This elevates bale 86 well above the ground, as shown in dotted lines in FIG. 1, and cart 2 may then be towed to transport the bale to any desired location. During transport, the bale is supported not only by spindles 60, but also by support members 20 of arms 14, and is thereby prevented from disarrangement or disintegration by the jolting and jostling to which it is subjected when being transported over rough terrain, particularly for long distances. It has been found that the spindles alone generally do not provide sufficient support under these circumstances. Stops 26 prevent lateral swaying of arms 14 and the bale during transport. After transport, the bale may be redeposited on the ground by substantially reversing the process described, that is, by operating winch 74 to pay out cable 70 to lower the bale to the ground, then freeing lever 38 from keeper 46 and pivoting it upwardly and rearwardly to allow arms 14 to be swung apart by springs 24.

If it is desired to unroll the bale on the ground for the feeding of livestock, spindles 60 are first engaged axially in the bale as already described, and then, with the bale still resting on the ground, cart 2 is moved slightly forwardly. Since the bale of course resists being moved over the ground, this forward movement of the cart causes extensions 48 of arms 14 to be extended slidably rearwardly from the arms, against the tension of springs 54, as far as permitted by bolts 50, that is, until the forward ends of slots 52 of the extensions engage said bolts. This movement moves support members 20 of arms 14 forwardly out of engagement with the bale, so that the bale is freed for rotation with spindles 60. The twine with which the bale is tied is then cut, and the cart is towed forwardly, with the bale resting on the ground, and the bale is unrolled on the ground for easy feeding access by livestock. During unrolling, control lever 75 of winch 74 is set in position to allow free rotation of the winch drum, so that cable 70 is paid out gradually to allow the bale to rest on the ground by gravity as its diameter decreases. Of course, when preparing to unroll a bale, the direction in which the bale was originally rolled during its formation should be determined, and the cart should approach the bale from the proper side thereof so as to provide for unrolling of the bale when the cart is towed forwardly. Arm extensions 48 are of course retracted automatically by springs 54 when the bale is unrolled.

While we have shown and described a specific embodiment of our invention, it will be readily apparent that many minor changes of structure and operation could be made without departing from the spirit of the invention.

What we claim as new and desire to protect by Letters Patent is:

1. A bale handling device comprising:
  a. a wheeled vehicle adapted to be moved over the ground,
  b. a pair of laterally spaced apart arms carried by said vehicle and extending rearwardly therefrom to bridge the ends of a cylindrical bale resting on the ground, said arms being disposed in a laterally horizontal plane, each of said arms being pivotally connected at its forward end to said vehicle on a transverse axis lying in a vertical plane, whereby to be horizontally pivotable, and for vertical movement about a transverse horizontal axis, c. a spindle carried by each of said arms at its rearward end, said spindle being generally horizontal and extending transversely of said arm toward the other of said arms, whereby when said arms are pivoted horizontally to a rearwardly divergent relation, said spindles may also bridge the ends of said bale, d. means operable to pivot said arms horizontally inwardly to a parallel position, whereby said spindles enter said bale axially thereof, e. means operable to pivot said arms simultaneously upwardly and forwardly toward a vertical position, whereby said spindles elevate said bale above the ground, and f. a bale support member affixed to each of said arms intermediate its pivotal axis and the spindle carried thereby, the support member of each arm extending toward the other of said arms, and being generally parallel with and laterally spaced apart from the associated spindle by a distance no greater than the radius of said cylindrical bale, whereby to be engaged by, and to assist said spindle in supporting the weight of, said bale as said arms are pivoted upwardly toward a vertical position, and whereby, as said vehicle is positioned to bridge said arms, while in their rearwardly divergent positions, across the ends of said bale, said support members engage a side of said bale and are deflected thereby to assist in pivoting said arms toward each other.

2. A bale handling device as recited in claim 1 wherein the transverse spacing between the bale support and spindle of each of said arms is less than the radius of a bale, whereby said support member indents the side of said bale when said spindle is engaged axially in said bale.

3. A bale handling device as recited in claim 1 wherein each of said arms is provided with an extension projecting rearwardly therefrom and being slidable relative thereto for limited alteration of the extension between minimum and maximum degrees of extension, the spindle of each arm being mounted in said arm extension, the transverse spacing between said spindle and said bale support member of each arm, at the minimum and maximum extensions of said arm extensions, being respectively less than and greater the radius of said bale.

4. A base handling device as recited in claim 3 with the addition of resilient means yieldably biasing each of said arm extensions toward its minimum degree of extension from its associated arm.

* * * * *